(12) United States Patent
Paulk et al.

(10) Patent No.: US 8,396,877 B2
(45) Date of Patent: Mar. 12, 2013

(54) METHOD AND APPARATUS FOR GENERATING A FUSED VIEW OF ONE OR MORE PEOPLE

(75) Inventors: Roderic W. Paulk, Wylie, TX (US); Donald R. Kretz, Plano, TX (US); Bryan D. Glick, State College, PA (US)

(73) Assignee: Raytheon Company, Waltham, MA (US)

( * ) Notice: Subject to any disclaimer, the term of this patent is extended or adjusted under 35 U.S.C. 154(b) by 78 days.

(21) Appl. No.: 13/169,759

(22) Filed: Jun. 27, 2011

(65) Prior Publication Data
US 2012/0330928 A1    Dec. 27, 2012

(51) Int. Cl.
*G06F 7/00*    (2006.01)
*G06F 17/30*    (2006.01)
(52) U.S. Cl. ......... 707/749; 707/780; 707/803; 707/808
(58) Field of Classification Search .................. 707/749, 707/780, 803, 808
See application file for complete search history.

(56) References Cited

U.S. PATENT DOCUMENTS

| | | | |
|---|---|---|---|
| 1,261,167 A | 4/1918 | Russell | |
| 6,073,105 A * | 6/2000 | Sutcliffe et al. | 705/14.4 |
| 6,177,931 B1 | 1/2001 | Alexander et al. | |
| 6,756,997 B1 | 6/2004 | Ward, III et al. | |
| 7,118,027 B2 | 10/2006 | Sussman | |
| 7,185,065 B1 | 2/2007 | Holtzman et al. | |
| 7,317,416 B2 | 1/2008 | Flom et al. | |
| 7,328,450 B2 | 2/2008 | Macrae et al. | |
| 7,421,419 B2 | 9/2008 | Maren | |
| 7,494,060 B2 | 2/2009 | Zagami | |
| 7,546,271 B1 * | 6/2009 | Chmielewski et al. | 705/38 |
| 7,600,017 B2 | 10/2009 | Holtzman et al. | |
| 7,634,662 B2 | 12/2009 | Monroe | |
| 7,698,188 B2 | 4/2010 | Hollas et al. | |
| 7,725,565 B2 | 5/2010 | Li et al. | |
| 7,873,639 B2 * | 1/2011 | Shipman | 707/737 |
| 7,908,194 B2 | 3/2011 | Hollas | |
| 7,908,645 B2 | 3/2011 | Varghese et al. | |
| 7,961,955 B1 | 6/2011 | Minter | |
| 7,983,490 B1 | 7/2011 | Minter | |
| 7,984,029 B2 | 7/2011 | Alspector et al. | |
| 7,984,053 B2 | 7/2011 | Jackson et al. | |
| 2009/0311997 A1 * | 12/2009 | Fried et al. | 455/414.3 |
| 2010/0017360 A1 * | 1/2010 | Bansal et al. | 707/1 |
| 2010/0293090 A1 * | 11/2010 | Domenikos et al. | 705/38 |

(Continued)

OTHER PUBLICATIONS

Informatica, "Identity Resolution Solution.", Oct. 29, 2008.

(Continued)

*Primary Examiner* — Phong Nguyen
(74) *Attorney, Agent, or Firm* — Schwegman Lundberg & Woessner, P.A.

(57) ABSTRACT

In accordance with particular embodiments, a method includes receiving data from disparate data sources comprising data associated with different people. At least one of the data sources comprises data associated with at least one common person. The method also includes extracting at least one record from each of the disparate data sources. Each extracted record is associated with a corresponding person and comprises at least one feature associated with the corresponding person. The method additionally includes distributing the records to computers configured to identify matches between the records based on at least one matching feature associated with two or more records. The method further includes merging the at least one feature from each of the records of each corresponding match into merged records, each merged record corresponding to a different match. The method also includes generating at least one fused view associated with the at least one common person and comprising a merged record.

21 Claims, 3 Drawing Sheets

U.S. PATENT DOCUMENTS

2010/0312837 A1* 12/2010 Bodapati et al. .............. 709/206
2011/0106857 A1* 5/2011 Besombe et al. ............. 707/803

OTHER PUBLICATIONS

Informatica, "Identity Resolution, a Key to Customer Data Integration Value." © 2008, Oct. 29, 2008.

SMA, "Identity Resolution: Technology Challenges and Strategic Imperatives for Insurance Industry Leaders." © 2009, Aug. 2009.

Apache Software Foundation, "The Apache *HBase* Book." © 2010, May 20, 2010.

Infoglide Software, Identity Resolution Engine Datasheet, "The Most Advanced Identity Resolution Technology.", Jan. 15, 2009.

Infoglide Software, Identity Resolution as a Service (IRAAS), Jan. 15, 2009.

Infoglide Software, Identity Resolution Engine (IRE), Jan. 15, 2009.

IBM InfoSphere Identity Insight, "Entity resolution and analysis platform for fighting threat and fraud." Overview, Jul. 2010.

IBM InfoSphere Identity Insight, "Entity resolution and analysis platform for fighting threat and fraud." Features and benefits, Jul. 2010.

ProjectDescription—Hadoop Wiki, "Introduction.", Sep. 20, 2009.

The VLDB Journal, Omar Benjelloun et al., "Swoosh: a generic approach to entity resolution,", 2007.

Indrajit Bhattacharya et al., "Collective Entity Resolution in Relational Data.", 2007.

Raytheon Leads Efforts to Build a Scalable, Interoperable Analytics System to Aid Defense, Jun. 9, 2010.

Information Center Home, "IBM InfoSphere Identity Insight.", May 2011.

Kretz et al., U.S. Appl. No. 13/169,718, Patent Application "Method and Apparatus for Assessing a Person's Security Risk," filed Jun. 27, 2011.

* cited by examiner

METHOD AND APPARATUS FOR GENERATING A FUSED VIEW OF ONE OR MORE PEOPLE

BACKGROUND

Entity resolution involves identifying two or more records (or fields associated with the records) that are associated with the same entity, or person, and consolidating the respective records into a single record. When dealing with different sources for the records, the algorithms have to resolve the discrepancies between the sources of the records. For example, the field names and formats may be different between different sources. Entity resolution algorithms typically rely on user-defined functions that compare fields or records to determine if they match (e.g., are they likely to represent the same real-world person). When a match is found, the matching records or fields are typically combined into a single record. Often, when the records are combined, the associated fields may be combined as well and data may be lost (e.g., creating a new name based on two slightly different versions of the name in the two matched records).

SUMMARY

The teachings of the present disclosure relate to methods and apparatuses for generating a fused view of one or more people. One such method includes receiving data from a plurality of disparate data sources. The plurality of data sources comprising data associated with a plurality of different people. At least two different data sources comprise data associated with at least one common person. The method also includes extracting a plurality of records. The plurality of records may comprise at least one record from each of the plurality of disparate data sources. Each of the extracted records may be associated with a corresponding real-world person and may comprise at least one feature associated with the corresponding person. The method additionally includes distributing the plurality of records to a plurality of computers. The plurality of computers are configured to identify one or more matches between the plurality of records based on at least one matching feature associated with two or more different records. The method further includes merging the at least one feature from each of the two or more different records of each corresponding match into one or more merged records. Each of the one or more merged records may correspond to a different match of the one or more matches. The method also includes generating at least one fused view. The at least one fused view may be associated with the at least one common person and may comprise at least a first merged record. The first merged record may comprise at least a first matching feature associated with two or more different records associated with the at least one common person.

Technical advantages of particular embodiments may include providing a single fused view for a particular person. The fused view may consolidate information about a single real-world person from multiple sources into a single fused view. Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
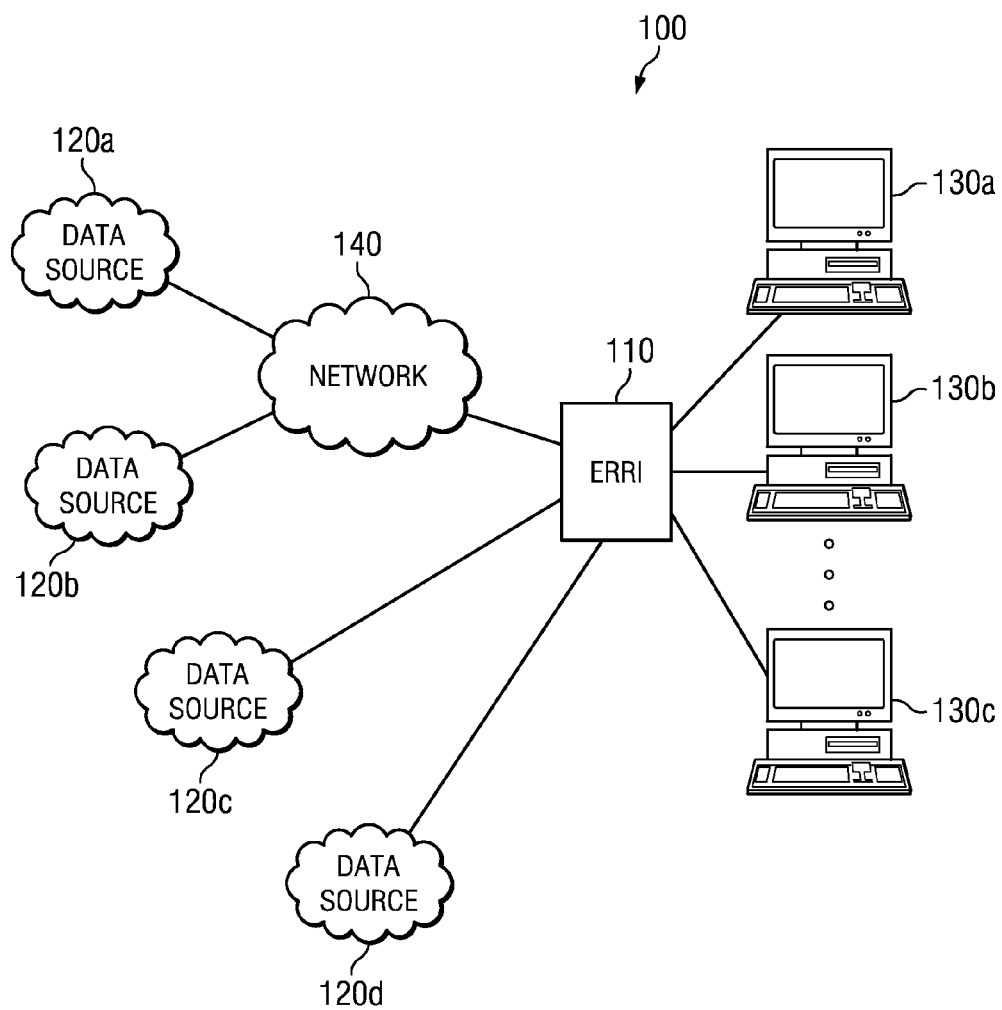
FIG. 1 illustrates a simplified diagram of a system comprising an entity resolution and relational intelligence computer coupled to data sources and computers, in accordance with a particular embodiment.

FIG. 1 illustrates a simplified diagram of an entity resolution and relational intelligence computer coupled to data sources and computers, in accordance with a particular embodiment. In system 100, entity resolution and relational intelligence (ERRI) computer 110 receives data from one or more of data sources 120a-120d (referred to collectively herein as data sources 120). ERRI computer 110 may extract records for each of the different people from the data received from data sources 120. The extracted records may be maintained in a record repository. Each extracted record may comprise one or more features associated with a different person. For example, a record from a forum may comprise the person's screen name and email address. Both the screen name and the email address may be maintained as separate features within the record. The extracted records may be sent to computers 130a-130c (referred to collectively herein as computers 130) to identify matching records. For example, if the same person participates in two different forums, computers 130 may identify the two records from the two forums as being associated with the same person. The features from the matching records may then be merged and the merged record may be added to the repository of records. Then, depending on the embodiment, ERRI computer 110 or computers 130 may identify relationships, and patterns associated with the relationships, between the people from the records and merged records in the record repository. The identified relationships and patterns may be added to the corresponding records. All this information may then be used to generate fused views for any of the people.

As discussed in more detail below with respect to FIG. 2, ERRI computer 110 may comprise any computer or combination of components configured to generate a fused view for one or more people based on data received from a plurality of disparate data sources 120. In certain embodiments, ERRI computer 110 may extract records from the data received from data sources 120. The extracted records may be organized in a table (e.g., via HBase). For example, each record may be a different row and each feature may be a different column. A record may comprise each feature associated with a particular person from a particular data source. For example, each feature (e.g., name, friend's name, location, etc.) extracted from a particular person's user account or profile from data source 120b may be entered into a corresponding feature column (each column is associated with a different type of feature). In some embodiments and/or scenarios the data entered into a feature, such as a name or an address, may be Romanized and/or parsed. This may allow ERRI computer 110 to introduce some uniformity to the data received from the disparate data sources 120. In some scenarios, the features may comprise non-textual information (e.g., a photograph of a person or a location).

In certain embodiments, ERRI computer 110 may distribute the extracted records to computers 110. The records may be distributed in a manner that may allow computers 130 to work in parallel. The distribution of the records may be such that additional computers 130 may be added as the number of records increases or in response to increases in urgency (e.g., to shorten response time to requests for a fused view). For example, in some embodiments the Hadoop framework may be used to allow linear scalability of system 100. In certain embodiments, ERRI computer 110 may provide one or more rules to computers 130. The rules may specify one or more requirements for finding a match between records. The requirements may comprise linking features with Boolean operators such as <AND>, <OR>, or <ANY>. For example, the rules may specify that a first feature <AND> a second feature must match for the records to be a match. The rules may, in some instances, combine multiple Boolean operators into a single rule. For example, the rules may specify that a first feature <AND> a second feature <OR> <ANY> of a third feature and a fourth feature must match for the record to be a match.

ERRI computer 110 may merge matching records identified by computers 130. In some embodiments, merging two or more records may comprise adding a unique user ID to the two or more matching records. In particular embodiments, merging two or more records may comprise combining the features from the two records into a new record. Both the matching records and the new merged record may include references to each other or a unique user ID indicating that they all correspond to the same real-world person.

In some embodiments, ERRI computer 110 may identify relationships between people based on the records (matched and unmatched records). The relationships may include explicit or obvious relationships, such as where one person is listed as a "friend" of another person. The relationships may include implicit or non-obvious relationships, such as two people who live in the same area and work for the same company. In some embodiments, a certain number of associations may be needed before a relationship is found. ERRI computer 110 may also analyze patterns of relationships, such as patterns in joint travel to particular locations or patterns of communications with particular other people. In some embodiments, ERRI computer 110 may provide computers 130 with one or more rules, protocols, and/or algorithms to allow computers 130 to identify relationships and relationship patterns.

Data sources 120 may comprise any of a variety of public data sources 120a and 120b (e.g., social networking websites, forums, blogs, chat rooms, etc.) and private data sources 120c and 120d (e.g., aviation no-fly lists, government watch lists, wanted lists, etc.). While public data sources 120a-120b are illustrated as being connected to ERRI computer 110 through network 140 and private data sources 120c-120d are illustrated as being connected directly to ERRI computer 110, any data source, whether private or public, may be accessed directly or via one or more networks (e.g., network 140). The data received from data sources 120 may comprise a wide variety of different information types arranged and/or formatted in different ways. For example, depending on the data source, a person may be identified by a screen name, an email address, the person's actual name, or some combination of the above. The information associated with each person may include information about the person's activities (e.g., travel, interests, etc.) and/or about other people. In some embodiments and/or scenarios ERRI computer 110 may receive private data from one of the public data sources 120a or 120b. For example, ERRI computer 110 may receive an email address associated with a profile, the email address may not be viewable by the public or it may not even be viewable by other people with a profile with the data source.

Computers 130 may comprise any number of any type of computer running any type of operating system. Computers 130 may be configured to work in parallel to identify matching features between the records extracted by ERRI computer 110. Computers 130 may use a variety of different algorithms, protocols, rules, and/or schemas to identify matching features between records. Matching features may include identical or similar features. In certain embodiments, matches may be found despite typographical errors. Matches may include temporal and/or spatial (or geographic) features.

Network 140 may comprise any network or combination of networks capable of transmitting signals, data, and/or messages, including, but not limited to, signals, file transfer protocols, data or messages transmitted through WebPages, e-mail, text chat, voice over IP (VoIP), and instant messaging. Generally, network 140 may provide for the communication of packets, cells, frames, or other portions of information (generally referred to as packets herein) between the various components. Network 140 may comprise one or more private and/or public (e.g., the Internet) networks.

Although a particular scenario is depicted and described with respect to FIG. 1, the fused view may be generated by matching records using any number of computers based on data from any number of data sources arranged in any suitable manner. Moreover, the components depicted in system 100 may vary in different embodiments and/or scenarios from the components discussed above with respect to FIG. 1.

Figure 2:
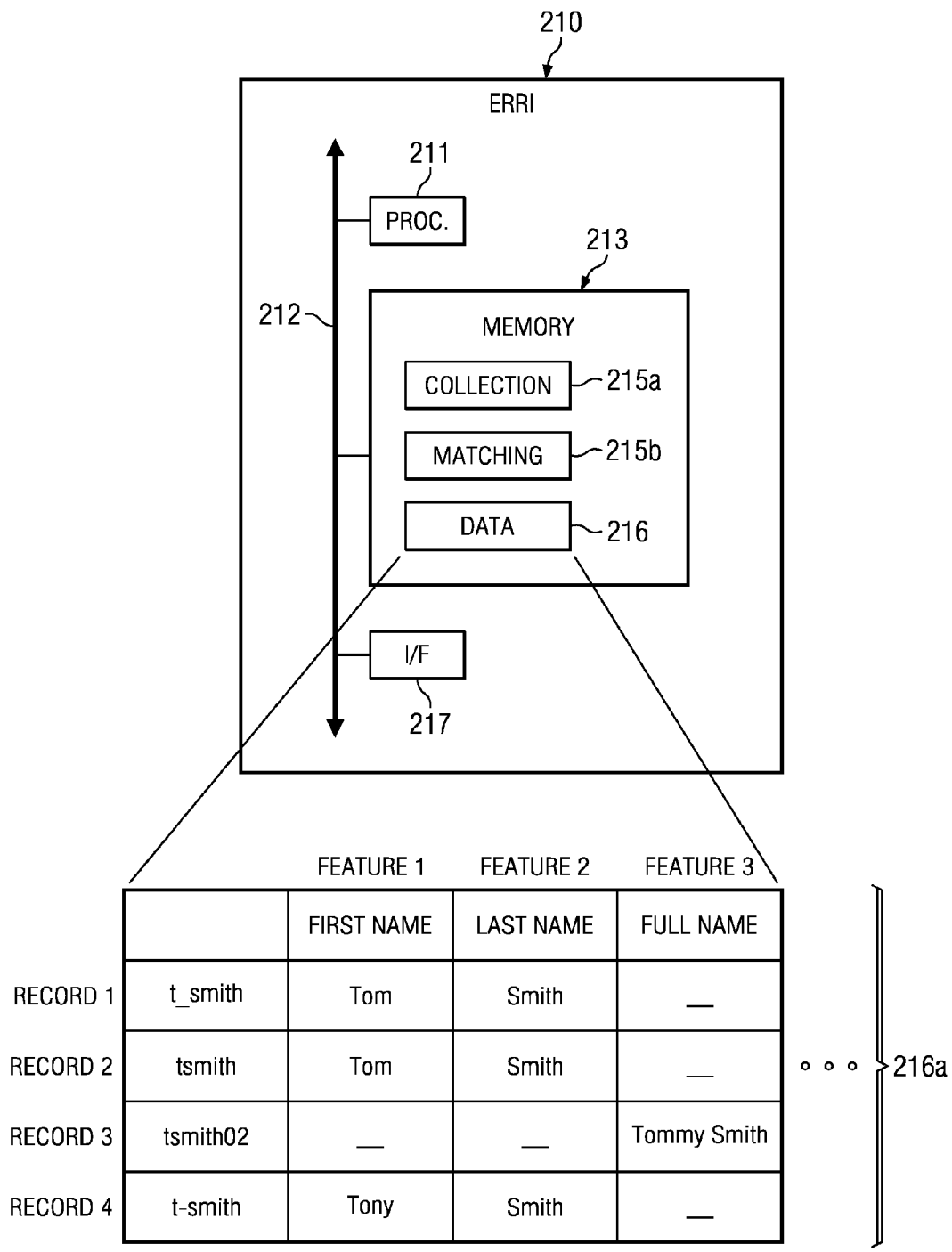
FIG. 2 illustrates a block diagram of an entity resolution and relational intelligence computer, in accordance with a particular embodiment.

FIG. 2 illustrates a block diagram of an entity resolution and relational intelligence computer, in accordance with a particular embodiment. The depicted ERRI computer 210 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein or provide functionality described or illustrated herein.

The components of ERRI computer 210 may comprise any suitable physical form, configuration, number, type and/or layout. As an example, and not by way of limitation, ERRI computer 210 may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, ERRI computer 210 may include one or more computer systems; be unitary or distributed; span multiple locations; span multiple machines; or reside in a cloud, which may include one or more cloud components in one or more networks. In one embodiment, ERRI computer 210 may be a component of, integrated in, or coupled to, a risk assessment system.

Where appropriate, ERRI computer 210 may perform without substantial spatial or temporal limitation one or more steps of one or more methods described or illustrated herein. As an example, and not by way of limitation, ERRI computer 210 may perform in real time or in batch mode one or more steps of one or more methods described or illustrated herein. One or more computers may perform at different times or at different locations one or more steps of one or more methods described or illustrated herein, where appropriate.

In the depicted embodiment, ERRI computer 210 may include processor 211, memory 213, interface 217, and bus 212. These components may work together to generate a fused view for one or more people based on data received from multiple disparate data sources. Although a particular computer is depicted as having a particular number of particular components in a particular arrangement, this disclosure contemplates any suitable computer having any suitable number of any suitable components in any suitable arrangement. For simplicity, only the components of ERRI computer 210 are depicted. Other devices, such as computers 130 or data sources 120 (both depicted in FIG. 1), may be coupled to ERRI computer 210 (e.g., via interface 217) but are not depicted herein.

Processor 211 may be a microprocessor, controller, or any other suitable computing device, resource, or combination of hardware, software and/or encoded logic operable to provide, either alone or in conjunction with other components (e.g., memory 213), the ability to generate fused views of different people from data received from different data sources. This functionality may further include providing various other features discussed herein. For example, processor 211 may distribute the extracted records to several computers (e.g., computers 130), running in parallel. Along with distributing the records among the computers, processor 211 may determine and/or distribute one or more rules, protocols, algorithms, and/or schemas, that one or more of the computers may use to identify matching records.

In particular embodiments, processor 211 may include hardware for executing instructions, such as those making up a computer program. As an example, and not by way of limitation, to execute instructions, processor 211 may retrieve (or fetch) instructions from an internal register, an internal cache, memory 213, or any other data storage device or component; decode and execute them; and then write one or more results to an internal register, an internal cache, memory 213, or any other data storage device or component.

In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in memory 213 or another data storage device or component. The instruction caches may speed up retrieval of those instructions by processor 211. Data in the data caches may be copies of data in memory 213, or another data storage device or component, for instructions executing at processor 211 to operate on; the results of previous instructions executed at processor 211 for access by subsequent instructions executing at processor 211, or for writing to memory 213 or another suitable data storage device or component. The data caches may speed up read or write operations by processor 211. The TLBs may speed up virtual-address translations for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

Memory 213 may be any form of volatile or non-volatile memory including, without limitation, magnetic media, optical media, random access memory (RAM) (e.g., dynamic RAM (DRAM), static RAM (SRAM), single-ported or multi-ported RAM, or any other suitable type of RAM), read-only memory (ROM) (e.g., mask-programmed ROM, programmable ROM (PROM), erasable PROM (EPROM), electrically erasable PROM (EEPROM), electrically alterable ROM (EAROM), or any other suitable type of ROM), flash memory, removable media, or any other suitable local or remote memory component or components. Memory 213 may include one or more memories 213, where appropriate. In particular embodiments, memory 213 may include mass storage for data or instructions. As an example and not by way of limitation, memory 213 may include an HDD, a floppy disk drive, flash memory, an optical disc, a magneto-optical disc, magnetic tape, or a Universal Serial Bus (USB) drive or a combination of two or more of these. Memory 213 may include removable or non-removable (or fixed) media, where appropriate. Memory 213 may be internal or external to ERRI computer 210, where appropriate. In particular embodiments, memory 213 may be non-volatile, solid-state memory. Memory 213 may take any suitable physical form and may comprise any suitable number or type of data storage. In particular embodiments, one or more memory management units (MMUs) may reside between processor 211 and memory 213 and facilitate accesses to memory 213 requested by processor 211.

In certain embodiments, memory 213 may store any suitable data or information utilized by ERRI computer 210, including software embedded in a computer readable medium, and/or encoded logic incorporated in hardware or otherwise stored (e.g., firmware). In particular embodiments, memory 213 may include main memory for storing instructions for processor 211 to execute or data upon which processor 211 may operate. For example, memory 213 may include collection logic 215a for collecting data from the disparate data sources and extracting the records therefrom; and matching logic 215b for determining the rules and how to distribute the data to other computers to find matches.

Memory 213 may also include data 216. Data 216 may include the data received from the disparate data sources and/or it may include the extracted and/or merged records (e.g., a records repository). In some embodiments, the extracted and/or merged records may be arranged as illustrated in table 216a.

Each row of table 216a may be a different record and each column of table 216a may be a different feature. Record 1, Record 2, Record 3, and Record 4 may each correspond to a different person's user account from the same or different data sources. For example, Record 1 may be associated with a person's user account having a user ID of t_smith. The person's user accounts may be associated with the same or different real-world people.

Feature 1, Feature 2, and Feature 3 may each correspond to a different type of information extracted from the data. The type of information may include any type of information which may be used to identify the person associated with the user ID and/or the person's relationship with other people. The features listed in table 216a include first name (Feature 1), last name (or given name or family name) (Feature 2), and full name (Feature 3). Other features may include, email address, home address, work address, geographical location, temporal information, phone numbers, friends (e.g., acquaintances, associates, co-workers, family members, followers, etc.), pictures, tag information, comments, or any other feature which may be used in determining whether two records match and/or what relationships the corresponding person has with other people. In some instances, processor 211 may manipulate the data from the data sources before it is added to a particular feature of a particular record. For example, processor 211 may romanize one or more Chinese characters into a first and/or last name. In some embodiments, memory 213 may further comprise any other data used in any calculations by processor 211.

In some embodiments, ERRI computer 210 may, by way of example and not by way of limitation, load instructions from some data storage component (such as, for example, a server or another computer system) to memory 213. Processor 211 may then load the instructions from memory 213 to an internal register or an internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to memory 213. In particular embodiments, processor 211 may execute only instructions in one or more internal registers or internal caches or in memory 213 (as opposed to another type of data storage or elsewhere) and may operate only on data in one or more internal registers or internal caches or in memory 213 (as opposed to another type of data storage or elsewhere).

Bus 212 may include any combination of hardware, software embedded in a computer readable medium, and/or encoded logic incorporated in hardware or otherwise stored (e.g., firmware) to couple components of ERRI computer 210 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 may include any number, type, and/or configuration of buses 212, where appropriate. In particular embodiments, one or more buses 212 (which may each include an address bus and a data bus) may couple processor 211 to memory 213. Bus 212 may include one or more memory buses.

In some embodiments, interface 217 may comprise any combination of hardware, encoded software, or a combination of hardware and encoded software configured to receive data and/or user inputs. Where appropriate, interface 217 may include one or more devices or encoded software drivers enabling processor 211 to drive and/or communicate with one or more remote or local devices. Interface 217 may include one or more interfaces 217, where appropriate.

In particular embodiments, interface 217 may include one or more interfaces for one or more I/O devices. One or more of these I/O devices may enable communication between a person and ERRI computer 210. As an example and not by way of limitation, an I/O device may include a keyboard, keypad, microphone, monitor, mouse, printer, scanner, speaker, still camera, stylus, tablet, touch screen, trackball, video camera, sensor, another suitable I/O device or a combination of two or more of these. Particular embodiments may include any suitable type and/or number of I/O devices and any suitable type and/or number of interfaces 217 for them. An operator may use one or more of these I/O devices to request and/or view a fused view of one or more people.

In certain embodiments, interface 217 may include one or more interfaces for one or more networks or other data sources. Interface 217 may comprise any hardware, connectors, ports, and/or protocols needed to communicate with the respective networks or data sources. For example, interface 217 may comprise a network interface card with an Ethernet port. This may, for example, allow ERRI computer 210 to connect to the Internet.

Herein, reference to a computer-readable storage medium encompasses one or more tangible, non-transitory, computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more non-transitory computer-readable storage media implementing any suitable storage. In particular embodiments, a computer-readable storage medium implements one or more portions of processor 211 (such as, for example, one or more internal registers or caches), one or more portions of memory 213, one or more portions other data storage devices or components, or a combination of these, where appropriate. In particular embodiments, a computer-readable storage medium implements RAM or ROM. In particular embodiments, a computer-readable storage medium implements volatile or persistent memory or data storage. In particular embodiments, one or more computer-readable storage media may embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Although not depicted, ERRI computer 210 may be coupled to a network. The term "network" should be interpreted as generally defining any network or combination of networks capable of transmitting signals, data, and/or messages, including, but not limited to, signals, file transfer protocols, data or messages transmitted through WebPages, e-mail, text chat, voice over IP (VoIP), and instant messaging. Generally, the network may provide for the communication of packets, cells, frames, or other portions of information (generally referred to as packets herein) between the various components. In some embodiments, ERRI computer 210 may connect to one or more data sources and/or one or more computers through one or more networks (e.g., the Internet).

The following example may help illustrate at least one way in which the components of ERRI computer 210 may work together to generate a fused viewed associated with one or more people based on data received from a number of disparate data sources. In this example, processor 211 may load, or otherwise execute, collection logic 215a. Collection logic 215a may be loaded and executed periodically, upon the occurrence of a triggering event, at scheduled times, continuously, or a combination of two or more of the above.

Once executed, collection logic 215a may receive data from any number of disparate data sources. These data sources may include both public and private data sources. For example, the public data sources may include social media sites and the private data sources may include government data sources. Moreover, in some instances collection logic 215a may receive private data from public data sources. These disparate data sources may maintain data in different formats and contain different types of data (e.g., name, dates, addresses, etc.). Data collection logic 215a may be able to extract different features from the data received from the various data sources. These features may be associated with particular people and may be arranged into individual records. Each record may correspond to a different account or user ID from each respective data source. Any information associated with the account or user ID may be placed into a different feature. In some embodiments, collection logic 215a may arrange the extracted data into a table in which each row corresponds to a different record (e.g., a different user account from a different data source) and each extracted feature from the corresponding user account may go into a different column. Each column may contain the same type of information. For example, feature 1 may comprise any identified first name from any record. In addition to extracting the various features from the data from each of the data sources, collection logic 215a may also be configured to normalize the data. For example, collection logic 215a may Romanize and/or parse people's names. As another example, collection logic 215a may assign a particular geocode representing a geographic area. For example, a particular city may have a particular geocode. As another example, collection logic 215a may parse a person's addresses including, but not limited to, email addresses, street addresses, home addresses and/or work addresses. Collection logic 215a may also be able to do trend literation of data collected and/or received from disparate data sources. Collection logic 215a may be running and collecting data independently of any matching that may be done. That is, collection logic 215a may be continually receiving data and extracting records without matching logic necessarily searching for matches.

Whereas collection logic 215a may be running continuously, matching logic 215b may be loaded and executed periodically, at scheduled intervals, or upon receiving a request or detecting a triggering event. That is, matching logic 215b may be run in a batch mode. In certain embodiments, matching logic 215b may be configured to distribute the records to several different computers. The records may be distributed so as to allow the computers to process the records in a parallel fashion. For example, the records and/or any matching logic may be divided into subsets, each computer working on a different subset. As another example, different computers may run different algorithms, the different algorithms may be running in parallel with one another.

Matching logic 215b may also be configured to distribute one or more rules along with the data records. The rules may specify how one or more features are to be combined in order for a match to be found. For example, one rule may specify that two records may match if Feature 1 <AND> Feature 2 match Feature 3. Other types of rules may include combining one or more features through <AND>, <OR>, <ANY>, or any other operator that may be used to combine rules in a way to allow greater control over matching. In some embodiments, matching logic 215b may also provide the computers with one or more algorithms, protocols, or logic configured to identify similar features. This may include, for example, identifying typographical errors, common variations of the same word, nicknames, or any other distinction between similar features. When two or more matching records are found, a unique user ID may be added to a new feature column of the matching records.

In some embodiments, matching logic 215b may also be able to identify one or more relationships between the various people. The relationships may be identified based on one or more features within the corresponding records. For example, relationships may be found where a person identifies another person as a friend, where two people work at the same company at the same location, where two people share an address (e.g., work or home), or any other indicator or factor that may be indicative of two people knowing one another. Matching logic 215b may also look for patterns within the relationships. Such as travel patterns or communication patterns. When a relationship is found, information about the relationship may be added to a new feature column for each of the corresponding people. This unique ID may correspond to an actual real-world person. That is, for any two records that have been determined to be associated with the same real-world person, a new unique user ID may be associated with that real-world person and added to each of the matching records.

Thus far, several different embodiments and features have been presented. Particular embodiments may combine one or more of these features depending on operational needs and/or component limitations. This may allow for great adaptability of ERRI computer 210 to the needs of various organizations and people. Some embodiments may include additional or different features. In particular embodiments, the functionality of ERRI computer 210 may be provided by additional or different devices.

Figure 3:
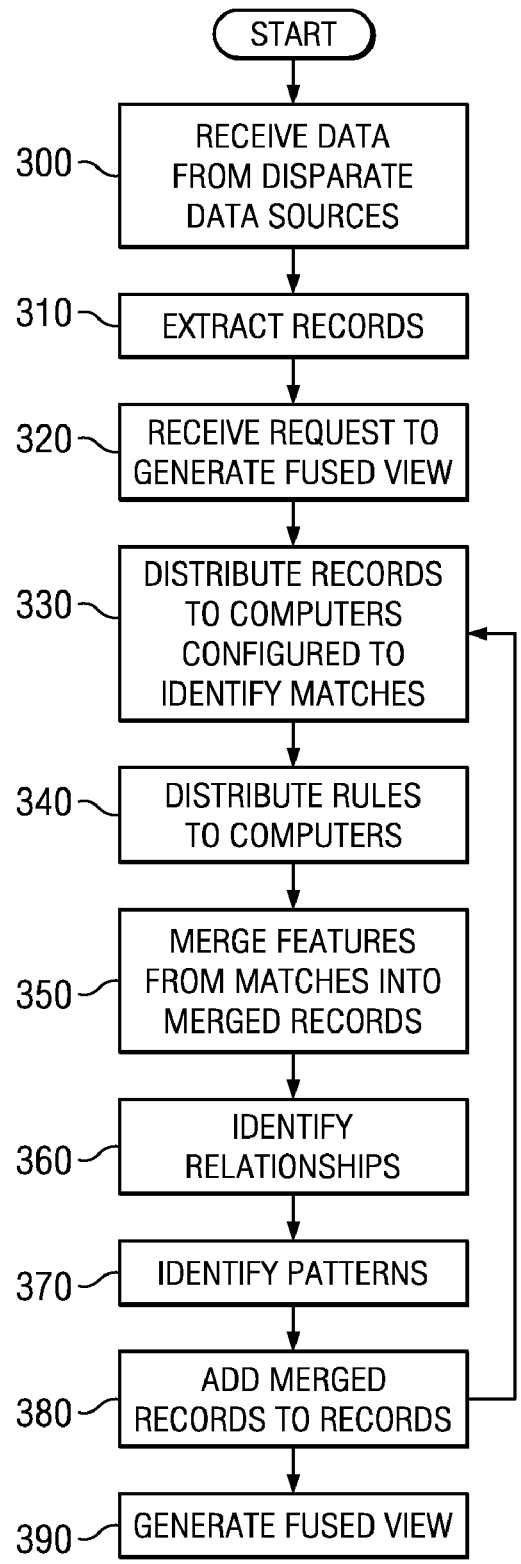
FIG. 3 illustrates a method for generating a fused view, in accordance with a particular embodiment.

FIG. 3 illustrates a method for generating a fused view, in accordance with a particular embodiment. In certain embodiments, the method of FIG. 3 may be performed by a computer, such as ERRI computer 210 of FIG. 2. For simplicity of illustration, the method of FIG. 3 may be presented from the perspective of a single ERRI computer. However, other devices may be used in addition to, or instead of, an ERRI computer.

The method begins at step 300 where data from disparate data sources is received. The data may be received by the ERRI computer. Once received the data may be stored at the ERRI computer or at an external data storage device coupled to the ERRI computer. The disparate data sources may include different and/or separate data sources maintained and/or operated by different business and/or government entities. For example, depending on the scenario and/or embodiment, the disparate data sources may include two or more of the following data sources: social media sites (e.g., Facebook, Linkedin, Twitter, MySpsace, etc.), forums, blogs, government watch lists (e.g., wanted lists, terrorist lists, persons of interest lists, no-fly lists, etc.), or any other data source which may include information about real-world people. The received data may include data associated with a plurality of different people, some of the people may have data associated with them at more than one of the disparate data sources. The data may be received and/or collected independent of any requests to generate a fused view (e.g., at step 320). For example, new data may be received continuously, periodically, at scheduled intervals, or upon a triggering event (e.g., upon new data being added to one or more of the data sources).

At step 310 records are extracted from the data received from the plurality of disparate data sources. The extracted records may comprise one record for each person's user account or profile from each data source. For example, if one data source has three-thousand user accounts and a second data source has five-thousand user accounts, then the ERRI computer would extract eight-thousand records. Each record may comprise at least one feature associated with the corresponding user account. The features may include, but are not limited to, screen name, user ID, real name, address (e.g., home, work, email, IP, etc.), phone number (e.g., cell phone, home phone, work phone, etc.), location (current location, home location, work location, travel location, city, state, county, country, latitude and longitude, etc.), known acquaintances or relationships, non-textual information (e.g., pictures, maps, audio files or recordings, video clips, etc.), timing information (e.g., when they posted a message, when they went on a trip, etc.), tags or other meta data, data source specific features, or any other information that may be used to identify or classify either the person or the relationships the person has with other people. In some embodiments, the records may be extracted into a database or table, such as HBase. HBase may comprise a generic table in which each row is associated with a different record and each column is associated with a different feature. Depending on the data source, the feature associated with a piece of information may be explicit (e.g., the data source may have a name field) or the ERRI computer may have to recognize that a piece of informant is a particular feature (e.g., recognize that a particular string of text is a user name for another person).

In some embodiments, the ERRI computer may normalize the extracted data. For example, the ERRI computer may romanize and/or parse names, add geocodes (e.g., unique codes based on predetermined geographical areas), parse addresses, transliterate, translate, and/or perform any other type of normalization that may be helpful in allowing different features from different data sources to be compared for possible matches. The data may also be cleaned by filtering out garbage entries and/or removing null fields and/or duplicate data.

At step 320 a request to generate a fused view is received. The request may be generated in any of a variety of ways including both user entered requests and automated or computer generated requests. For example, a government agent that would like to identify all the records and relationships associated with a particular person, may send a request to the ERRI computer for a fused view associated with that person. As another example, the ERRI computer may be connected to, or a component of, a larger computer system designed to identify persons of interest. The larger computer system may use the steps illustrated in FIG. 3 as a way of condensing the information from the plurality of disparate data sources into a number of fused views associated with each of the individual people.

At step 330 the records are distributed to several computers configured to identify matches between the records. In certain embodiments, the records may be distributed in such a way as to allow several computers to work through a large amount of records in a parallel fashion. The number of computers to which the records are distributed may vary depending on operational parameters. The computers may be running different matching algorithms or they may be running the same algorithm for different subsets of the records. In some embodiments, the records may be distributed using the Hadoop framework.

Matching records may be identified based on the likelihood that two or more different records correspond to the same real-world person. That is, it is likely that many real-world people will have accounts or profiles with more than one social media site and that some people on various government watch lists may also have social media accounts. The computers may not be able to actually identify the real-world person, but they may be able to identify records that correspond to the same real-world person. A computer may be configured to identify the matches based on matching one or more features associated with the different records.

There may be more than one type of feature matching done by the computers. For example, the computers may be configured to do one or more of exact matching (e.g., the same information for the same features for two or more records); non-textual matching (e.g., matching facial features from pictures or voice signatures from audio files, etc.); similarity matching (e.g., textual, geo spatial, or temporal similarity matching); or any other type of matching between features of two or more records.

The matching algorithms, rules, and/or protocols used to find matches may include any number of techniques for identifying matches despite the features not being exactly the same. In some embodiments, matches may be found where two different words are used to reference the same person, place, or thing. For example, a match may be found between Tom and Tommy or AAC and America Airlines Center. Matches may also be found despite typographical errors.

In some embodiments, a match having textual similarity may comprise using a user defined comparison algorithm with a threshold value and blocking strategy. Geo spatial similarity matching may comprise geo spatially encoded features that fall within the same grid designation. Temporal similarity matching may provide features that are within the same time block. In some embodiments, matching may employ feature sprawl. Feature sprawl may comprise the ability to combine features to be compared as one feature for matching. For example, referring to table 216a, feature sprawl may be used to identify a match between Record 1 and Record 3 based on Feature 1 of Record 1 comprising the first name of "Tom" and Feature 2 of Record 1 comprising the last name "Smith" and Feature 3 of Record 3 comprising the full name "Tommy Smith." Another type of matching may comprise feature set matching. Feature set matching may comprise the ability to handle mismatched feature naming, such as matching a first name feature from one person and a full name feature from another person.

At step 340 rules may be distributed to the computers. The rules may comprise algorithms, protocols, and/or logic for the computers to use in identifying matches. In some embodiments, the rules may include requirements for how features should be arranged or combined in order to find a match. In certain embodiments, the rules may specify that one or more features may be combined using <AND>, <OR>, or <ANY>. For example, referring to table 216a, a match may require that Feature 1 <AND> Feature 2 of two different records match. As another example, a match may require a similarity between <ANY> of Features 1 and 2 of two different records.

At step 350, features from matched records are merged into a merged record. Each merged record may comprise features from the two or more records that were identified as being matches. In some embodiments, the merged record may be added to the other records in a record repository and re-distributed at step 330. In some embodiments, when merging the features from the two or more identified matching records, the two underlying, or original, records are maintained within the plurality of records. In certain embodiments, when two or more records are merged, a unique identifier may be added to each of the matching records. The unique identifier may be associated with the match.

At step 360 one or more relationships are identified between people. The identified relationships may be added as a feature to the corresponding records of the associated people. In some embodiments, the relationships may be identified and maintained in a separate list of records or as separate records with the records extracted from the disparate data sources. Some possible types of relationships include, but are not limited to, employment relationships, school or education based relationships, travel relationships, neighbor or location based relationships, behavior based relationships, communication relationships, or any other relationship which may suggest that two or more people know each other.

At step 370 patterns are identified between the relationships of the people. For example, the extracted records may not include information from which it may be determined that a first person and second person have a relationship, but if the first person and a third person have a relationship and the second person and the third person have a relationship then a pattern may suggest that the first person and the second person have a relationship through the third person. Patterns in travel and/or communication may also be identified.

At step 380, after the matched records have been identified and any relationships and patterns have also been identified, the updated merged records may be added to the existing plurality of records that were extracted at step 310. The method may then return to step 330 and re-execute steps 330 through 380. This may be repeated as many times as needed or specified. For example, in some embodiments this may be repeated until no additional matches are found. As another example, an operator may specify that the steps may be repeated a fixed number of times.

At step 390 a fused view is generated. The fused view may comprise a representation of the gathered features from the different data sources as well as the identified relationships and patterns associated with each person. This may allow the system to present a more complete representation of a particular real-world person based on all the information that has been gathered and analyzed from the disparate data sources.

While the embodiment depicted in FIG. 3 includes a certain number of steps, depicted in a certain order, it is to be understood that other embodiments may have more, fewer or different steps, and the steps may be rearranged or performed simultaneously. For example, in some embodiments, relationships and patterns may be identified after the ERRI computer has determined that all the matches have been found.

While various implementations and features are discussed with respect to multiple embodiments, it should be understood that such implementations and features may be combined, re-arranged, or modified in various embodiments. For example, features and functionality discussed with respect to a particular figure, such as FIG. 1, may be used in connection with features and functionality discussed with respect to another such figure, such as FIG. 2 or FIG. 3, according to operational needs or desires. Furthermore, the elements of ERRI computer 210 may be combined, rearranged or positioned in order to accommodate particular operational needs. In addition, any of these elements may be provided as separate external components to each other where appropriate. Particular embodiments contemplate great flexibility in the arrangement of these elements as well as their internal components.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims.

What is claimed:

1. A method comprising:
    receiving data from a plurality of disparate data sources, the plurality of data sources comprising data associated with a plurality of different people, at least two different data sources comprising data associated with at least one common person;
    extracting a plurality of records, the plurality of records comprising at least one record from each of the plurality of disparate data sources, each extracted record associated with a corresponding person and comprising at least one feature associated with the corresponding person;
    distributing the plurality of records to a plurality of computers configured to identify one or more matches between the plurality of records based on at least one matching feature associated with two or more different records;
    merging the at least one feature from each of the two or more different records of each corresponding match into one or more merged records, each of the one or more merged records corresponding to a different match of the one or more matches; and
    generating at least one fused view, the at least one fused view associated with the at least one common person and comprising at least a first merged record comprising at least a first matching feature associated with two or more different records associated with the at least one common person.

2. The method of claim 1, further comprising:
    adding the one or more merged records to the plurality of records;
    re-distributing the plurality of records to the plurality of computers further configured to identify one or more additional matches between the plurality of records based on at least one matching feature associated with two or more different records; and
    merging the at least one feature from each of the two or more different records into one or more additional merged records, each of the one or more additional merged records corresponding to a different additional match of the one or more additional matches.

3. The method of claim 1:
    further comprising identifying one or more relationships between the at least one common person and the plurality of different people; and
    wherein the at least one fused view further comprises a representation of the one or more relationships.

4. The method of claim 3:
   further comprising identifying one or more patterns associated with the identified one or more relationships between the at least one common person and the plurality of different people; and
   wherein the at least one fused view further comprises a representation of the one or more patterns.

5. The method of claim 1, further comprising distributing one or more rules to the plurality of computers along with the plurality of records, the one or more rules specifying how at least two features associated with two or more different records are to be combined in order to identify one or more matches between the plurality of records.

6. The method of claim 1, further comprising receiving a request to generate the at least one fused view, the request received after receiving data from the plurality of disparate data sources and before distributing the plurality of records to the plurality of computers.

7. The method of claim 1, wherein the at least one matching feature associated with two or more different records comprises a first feature associated with a first record of the two or more records that is similar to a second feature associated with a second record of the two or more records.

8. An apparatus comprising:
   an interface configured to receive data from a plurality of disparate data sources, the plurality of data sources comprising data associated with a plurality of different people, at least two different data sources comprising data associated with at least one common person; and
   a processor coupled to the interface and configured to:
      extract a plurality of records, the plurality of records comprising at least one record from each of the plurality of disparate data sources, each extracted record associated with a corresponding person and comprising at least one feature associated with the corresponding person;
      distribute the plurality of records to a plurality of computers configured to identify one or more matches between the plurality of records based on at least one matching feature associated with two or more different records;
      merge the at least one feature from each of the two or more different records of each corresponding match into one or more merged records, each of the one or more merged records corresponding to a different match of the one or more matches; and
      generate at least one fused view, the at least one fused view associated with the at least one common person and comprising at least a first merged record comprising at least a first matching feature associated with two or more different records associated with the at least one common person.

9. The apparatus of claim 8, wherein the processor is further configured to:
   add the one or more merged records to the plurality of records;
   re-distribute the plurality of records to the plurality of computers further configured to identify one or more additional matches between the plurality of records based on at least one matching feature associated with two or more different records; and
   merge the at least one feature from each of the two or more different records into one or more additional merged records, each of the one or more additional merged records corresponding to a different additional match of the one or more additional matches.

10. The apparatus of claim 8:
    wherein the processor is further configured to identify one or more relationships between the at least one common person and the plurality of different people; and
    wherein the at least one fused view further comprises a representation of the one or more relationships.

11. The apparatus of claim 10:
    wherein the processor is further configured to identify one or more patterns associated with the identified one or more relationships between the at least one common person and the plurality of different people; and
    wherein the at least one fused view further comprises a representation of the one or more patterns.

12. The apparatus of claim 8, wherein the processor is further configured to distribute one or more rules to the plurality of computers along with the plurality of records, the one or more rules specifying how at least two features associated with two or more different records are to be combined in order to identify one or more matches between the plurality of records.

13. The apparatus of claim 8, wherein the processor is further configured to receive a request to generate the at least one fused view, the request received after receiving data from the plurality of disparate data sources and before distributing the plurality of records to the plurality of computers.

14. The apparatus of claim 8, wherein the at least one matching feature associated with two or more different records comprises a first feature associated with a first record of the two or more records that is similar to a second feature associated with a second record of the two or more records.

15. A non-transitory computer readable medium comprising logic configured to:
    receive data from a plurality of disparate data sources, the plurality of data sources comprising data associated with a plurality of different people, at least two different data sources comprising data associated with at least one common person;
    extract a plurality of records, the plurality of records comprising at least one record from each of the plurality of disparate data sources, each extracted record associated with a corresponding person and comprising at least one feature associated with the corresponding person;
    distribute the plurality of records to a plurality of computers configured to identify one or more matches between the plurality of records based on at least one matching feature associated with two or more different records;
    merge the at least one feature from each of the two or more different records of each corresponding match into one or more merged records, each of the one or more merged records corresponding to a different match of the one or more matches; and
    generate at least one fused view, the at least one fused view associated with the at least one common person and comprising at least a first merged record comprising at least a first matching feature associated with two or more different records associated with the at least one common person.

16. The medium of claim 15, wherein the logic is further configured to:
    add the one or more merged records to the plurality of records;
    re-distribute the plurality of records to the plurality of computers further configured to identify one or more additional matches between the plurality of records based on at least one matching feature associated with two or more different records; and merge the at least one feature from each of the two or more different records into one or more additional merged records, each of the one or more additional merged records corresponding to a different additional match of the one or more additional matches.

17. The medium of claim 15:
wherein the logic is further configured to identify one or more relationships between the at least one common person and the plurality of different people; and
wherein the at least one fused view further comprises a representation of the one or more relationships.

18. The medium of claim 17:
wherein the logic is further configured to identify one or more patterns associated with the identified one or more relationships between the at least one common person and the plurality of different people; and
wherein the at least one fused view further comprises a representation of the one or more patterns.

19. The medium of claim 15, wherein the logic is further configured to distribute one or more rules to the plurality of computers along with the plurality of records, the one or more rules specifying how at least two features associated with two or more different records are to be combined in order to identify one or more matches between the plurality of records.

20. The medium of claim 15, wherein the logic is further configured to receive a request to generate the at least one fused view, the request received after receiving data from the plurality of disparate data sources and before distributing the plurality of records to the plurality of computers.

21. The medium of claim 15, wherein the at least one matching feature associated with two or more different records comprises a first feature associated with a first record of the two or more records that is similar to a second feature associated with a second record of the two or more records.

* * * * *